(12) United States Patent
Lopatinsky

(10) Patent No.: US 6,194,798 B1
(45) Date of Patent: Feb. 27, 2001

(54) FAN WITH MAGNETIC BLADES

(75) Inventor: Edward Lopatinsky, La Jolla, CA (US)

(73) Assignee: Air Concepts, Inc., Chulavista, CA (US)

( * ) Notice: Subject to any disclaimer, the term of this patent is extended or adjusted under 35 U.S.C. 154(b) by 0 days.

(21) Appl. No.: 09/172,524

(22) Filed: Oct. 14, 1998

(51) Int. Cl.⁷ .............................. H02K 1/27; H02K 37/00
(52) U.S. Cl. .................. 310/63; 310/62; 417/356
(58) Field of Search ................... 310/62, 63; 417/356

(56) References Cited

U.S. PATENT DOCUMENTS

| 3,932,069 | 1/1976 | Giardini et al. | 417/420 |
| 4,164,690 | 8/1979 | Müller et al. | 318/254 |
| 4,181,172 | 1/1980 | Longhouse | 165/51 |
| 4,367,413 | * 1/1983 | Nair | 290/52 |
| 4,459,087 | * 7/1984 | Barge | 417/356 |
| 4,553,074 | 11/1985 | Jacquemet | 318/130 |
| 4,553,075 | 11/1985 | Brown et al. | 318/254 |
| 4,670,677 | 6/1987 | Snider et al. | 310/63 |
| 4,962,734 | 10/1990 | Jorgensen | 123/41.49 |
| 4,995,787 | 2/1991 | O'Connor | 416/228 |
| 5,019,735 | 5/1991 | Lee | 310/89 |
| 5,075,606 | * 12/1991 | Lipman | 318/254 |
| 5,090,088 | * 2/1992 | Toth | 15/405 |
| 5,197,854 | 3/1993 | Jordan | 415/119 |
| 5,433,118 | 7/1995 | Castillo | 73/861.77 |
| 5,443,363 | 8/1995 | Cho | 415/211.1 |
| 5,607,329 | * 3/1997 | Cho et al. | 440/6 |
| 5,616,974 | * 4/1997 | Yamada | 310/68 B |
| 5,644,224 | 7/1997 | Howard | 324/165 |
| 5,692,882 | * 12/1997 | Bozeman, Jr. et al. | 417/45 |
| 5,695,471 | * 12/1997 | Wampler | 604/131 |

FOREIGN PATENT DOCUMENTS

| 981699 | 12/1982 | (RU) . |
| 1789761 | 1/1993 | (RU) . |
| 1815424 | 5/1993 | (RU) . |

* cited by examiner

Primary Examiner—Karl Tamai
(74) Attorney, Agent, or Firm—Edward Dreyfus

(57) ABSTRACT

A DC driven fan with blades made of magnetized material and permanently magnetized in the radial direction and cooperating with a plurality of electromagnetic stator coils mounted external to the outer fan edges. Adjacent blades have alternate N-S, S-N radial magnetic orientations. In one embodiment, the blades are mounted in a non-ferrous hub and in an alternate embodiment they are mounted in a ferrous hub so that adjacent blades function like a U or V-shaped magnet. Blades can be made of magnetized ferrous, ferromagnetic, or magnetized plastic depending upon the application and blade strength specifications.

11 Claims, 8 Drawing Sheets

FAN WITH MAGNETIC BLADES

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A "MOCROFICHE APPENDIX"

Not Applicable

BACKGROUND

This invention relates to fans and more particularly to DC motor driven fans with stator electromagnets displaced radially beyond the periphery of the rotor.

DESCRIPTION OF RELATED ART

This type of fan is known, for example, by U.S. Pat. Nos. 4,553,075 and 4,459,087. The '075 patent includes an annular permanent magnet magnetized in segments about its circumference. Each segment is oppositely radially magnetized with respect to its adjacent segments. Fan blades are located within the annular magnet. A coil comprising two electrically independent bifilar wound windings, connected to be oppositely energized, and an electromagnet structure defining two pole pieces reside outside the permanent magnet annulus. A Hall effect device alternately energizes the separate coil windings in response to passage of the segments of the rotor magnet to alternately produce opposite magnetic fields in the pole pieces.

The '087 patent includes a fan unit for cooling an internal combustion engine comprising a fan impeller associated with a coaxial channel for guiding the air traveling through said impeller and an electric driving motor of DC type. The channel is fixed to the ends of the blades of the impeller and rotates with the impeller and itself constitutes the rotor of the electric motor whose stator coaxially surrounds at least a part of the channel. The stator is rigid with a fixed shaft around which the impeller rotates.

The fan units disclosed in both of these prior patents and, indeed, in the known prior art suffer from the disadvantage of requiring large mass ring member that encircles the distill edges of the blades in order to establish the N-S radially oriented magnetic segments that cooperate with the stator electromagnetic fields to generate torque and motion. These members prevent miniaturization of the fan design, require a large mass ring member or expensive magnetic materials which increases manufacturing cost and power consumption during operation and generally lowers the efficiency of the fan unit.

BRIEF SUMMARY OF EXEMPLARY EMBODIMENTS OF THE PRESENT INVENTION

An exemplary embodiment according to the principles of the present invention includes a DC driven fan with blades made of magnetized material and substantially permanently magnetized in the radial direction. In this way, the structure of an annular large mass magnetic ring, as found in the prior art, can be eliminated or reduced because, according to the principles of the present invention, its function has been transferred to the fan blades themselves. Alternatively, the mass of a magnetic ring can be reduced significantly because the mass of the blades contributes to the magnetic function of the impeller. The efficiency of the fan is enhanced by (i) making the outer edge of each blade wider than its inner edge, which tends to alleviate the contradiction between the two blade functions (1) to move air and (2) to produce torque, and (ii) eliminating or reducing the large mass (i.e., annular magnetic ring) from or at the outer edges or periphery of the blades.

In one exemplary embodiment, adjacent blades are magnetized in the opposite manner such that the outer-inner portions would comprise a N-S permanent magnet orientation and the adjacent blade outer-inner portions would comprise a S-N permanent magnet orientation. Each blade inner side is mounted in a non-ferrous hub.

Another feature of the fan according to the present invention enables the impeller to be formed by two sub-impellers with equal number of blades. All blades of one sub-impeller are magnetized uniformly, such as all outer portions being N. All blades of the other sub-assembly are magnetized uniformly, but opposite the first sub-impeller, i.e., all outer blade portions being S. The two sub-impellers are then fixed to each other and mounted about the same rotating axis with the blades of one equally annularly spaced from or between the blades of the other to form blade portions with alternating N-S orientations.

An alternate exemplary embodiment according to the principles of the present invention includes mounting each blade in a ferrous material hub to magnetically join the inner radial ends of adjacent pairs of magnetized blades. Accordingly, each adjacent pair of blades and associated hub portion function like a U-shaped or V-shaped magnet with its N-S field in the air-gap generated by the magnetized blades interacting with the DC pulsed-induced field of the electromagnet to power the fan.

Various important advantages result from a fan design according to the principles of the present invention, such as reduction in manufacturing costs, increased impeller airflow area, increased airflow per unit power consumed, reduced losses, enhanced miniaturization of fan dimensions while achieving low power consumption and high airflow specifications. This last benefit is important for small fans used, for example, in electronic equipment such as personal computers, fan trays, and a vast variety of electronic instrumentation apparatus.

The physical design of the fan system and shape of the blades can take a wide variety of forms related to predetermined applications. For example, principles of the present invention can be applied to axial flow fans, centrifugal flow fans, large, small and micro-fans, as desired.

BRIEF DESCRIPTION OF THE SEVERAL VIEWS OF THE DRAWINGS

Other and further advantages and benefits afforded by fans embodying the principles of the present invention will become apparent with the following detailed description of exemplary embodiments when taken in view of the appended drawings, in which.

DETAILED DESCRIPTION OF THE INVENTION

One fan embodiment 10 according to the principles of the present invention is shown in FIG. 1–4 and includes a housing 12, rotor impeller assembly 14 and stator coil assembly 16.

Figure 1:
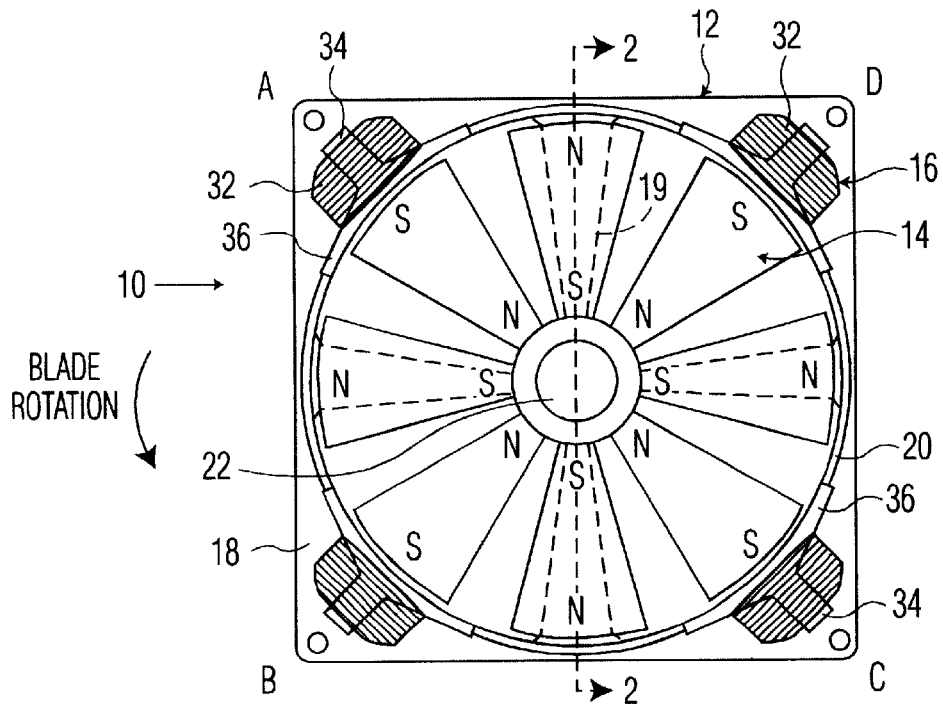
FIG. 1 is a pictorial representation of a front elevation of an exemplary fan embodiment according to the principles of the present invention.
Figure 2:
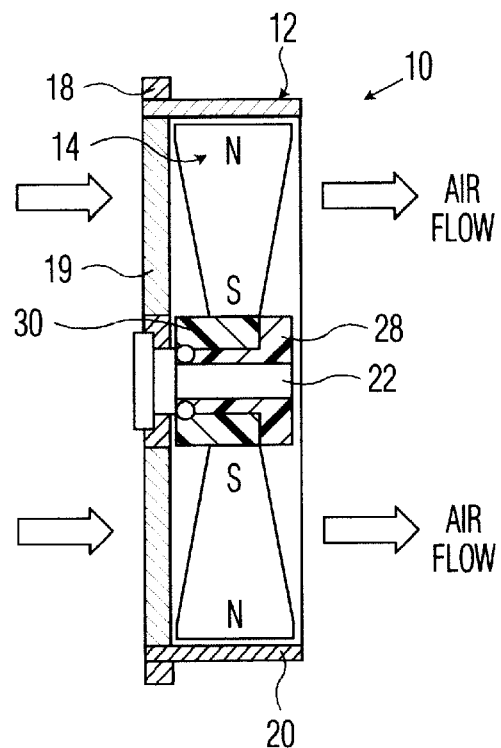
FIG. 2 is a side section elevation view taken along line 2—2 of FIG. 1.

Housing 12 includes a plate or frame member 18 preferably supporting a cylindrical ring, cowling or shroud 20 that confines and directs the air flow indicated generally by the arrows in FIG. 2. Frame 18 includes struts 19 spaced sufficiently to enable at least maximum rated intake air to pass through in response to impeller operation described below. Frame 18 and struts 19 also mounts and supports the impeller axis or shaft 22.

In this exemplary embodiment, the impeller assembly 14 includes two sub-impellers 24 and 26 each having four blades, each blade being formed of suitable material that can function as a permanent magnet with sufficient mechanical strength to function as described below. Examples include ferromagnetic impregnated plastics and ferrous materials (such as steel, iron, or ferrous alloys) that have been permanently magnetized. Examples of such magnetized plastic materials are disclosed in U.S. Pat. Nos. 5,648,013 and 5,800,839, the latter disclosing a method of making the same. When processing the materials into the fan blades according to the present invention, if desired, the magnetic materials can be evenly distributed in the radial direction or alternatively can be more heavily concentrated toward the radially outer edge of each blade so long as the magnetic properties of each blade are substantially the same. Concentration gradients or uniformity of magnetic materials in the circumferential direction throughout each blade can also be selected to yield the greatest blade magnetic field interaction with the pole shoe field given the particular shape of the fan blade and shoe.

Figure 3:
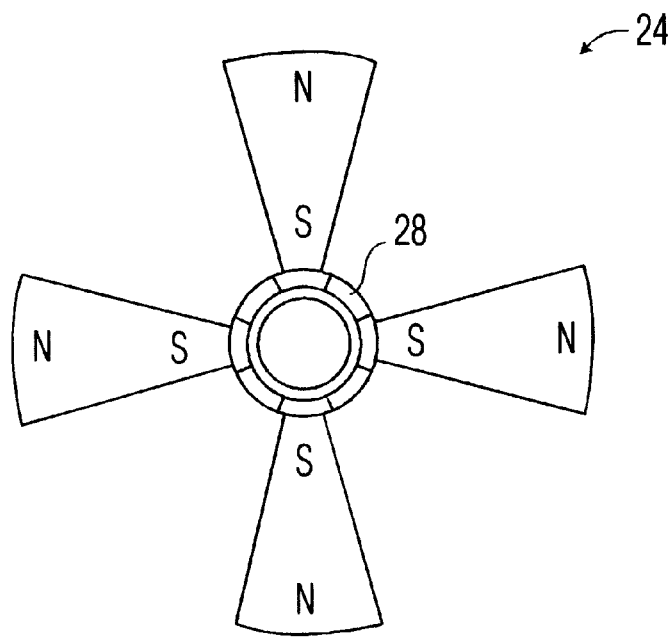
FIG. 3 is a front elevation of a sub-impeller of FIG. 1.

All blades, e.g. four blades of FIG. 3, can be magnetized simultaneously as a unit after blade assembly on to bushing 28 or blades can be magnetized prior to assembly on bushing 28, as desired. The same applies to all, e.g. four blades of FIG. 4. It is preferred that the dimension of each blade for the type of fan shown in FIG. 1–4 expand in the radial direction for enhancing the rotor torque and air impeller functions of the system.

Figure 4:
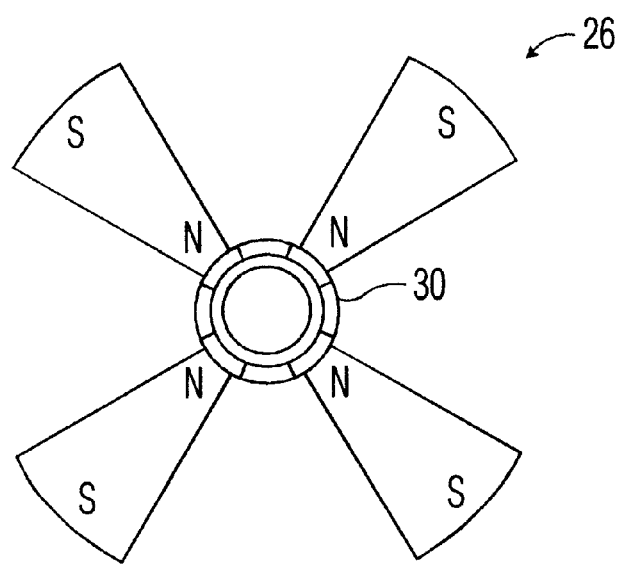
FIG. 4 is a front elevation of the other sub-impeller of FIG. 1.

Each blade of sub-impeller 24 is, for example, permanently magnetized with outer-to-inner edges bearing N-S orientation and each blade of sub-impeller 26 having the opposite S-N orientation as seen in FIGS. 3 and 4. Blades of sub-impeller 24 mount in a bearing bushing 28 that rotates with low friction on shaft 22. Blades of sub-impeller 26 mount in bushing 30 that mounts by any suitable means in fixed or secured relation to bearing bushing 28. Bushings 28 and 30 interlock for the fan blade assembly that revolves about shaft 22. As better seen in FIG. 3, the blades of impeller 14 are equally spaced in the annular direction and alternate in N-S orientation. In this example, all blades are substantially equal in size, mass, magnetic properties, and magnetic parameter, and it is preferred that the gap between the outer blade edges, pole shoe 36, and shroud 20 be as small as possible for maximum torque to be generated with a given power consumption and airflow.

Bushings 28 and 30 can be formed of any suitable non-magnetic materials such as copper, aluminum, or non-ferrous alloy or standard hard plastic normally used in these types of devices. Blades can mounted and be secured in bushings 28 and 30 in any suitable manner such as that disclosed in U.S. Pat. Nos. 4,451,205 or 4,451,202, both issued May 29, 1984, and can be suitably aerodynamically shaped for efficient impeller action such as described in U.S. Pat. No. 5,197,854.

Motor stator 16 includes electromagnetic coil assemblies 32 having a predetermined number of coil turns around iron core 34 that forms an electromagnetic pole shoe 36 having an elongated arcuate shape in the annular direction. The ends of the respective shoes 36 abut the edges of shroud 20 elements to enclose the cylindrical space about the impeller blades. Shroud 20 is preferably made of plastic or aluminum. As better seen in FIG. 1, this embodiment includes four electromagnetic coil assemblies mounted to frame 18 preferably at the corners thereof.

Figure 5:
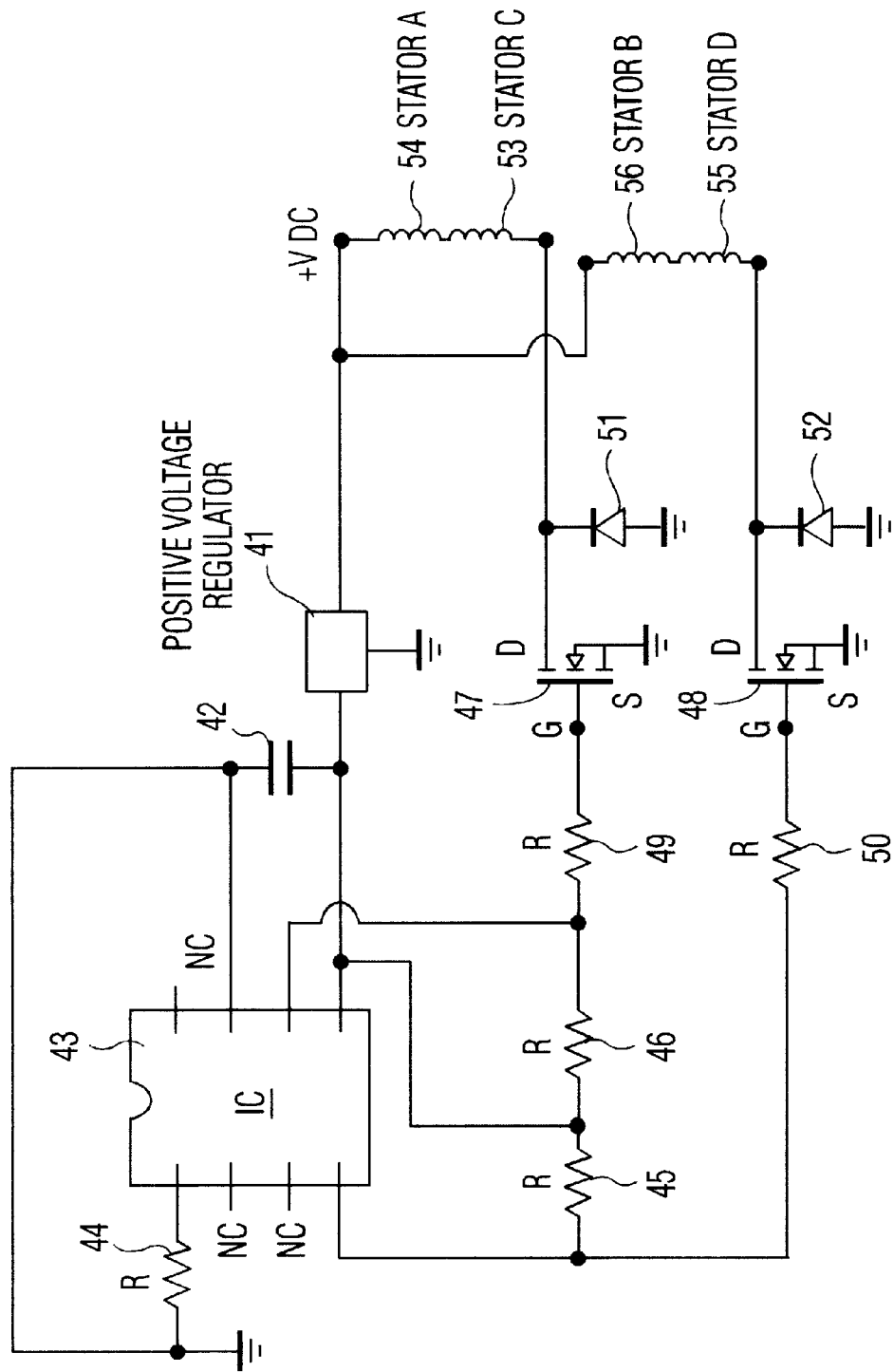
FIG. 5 is a schematic diagram of an exemplary power circuit for the fan of FIG. 1.
Figure 6:
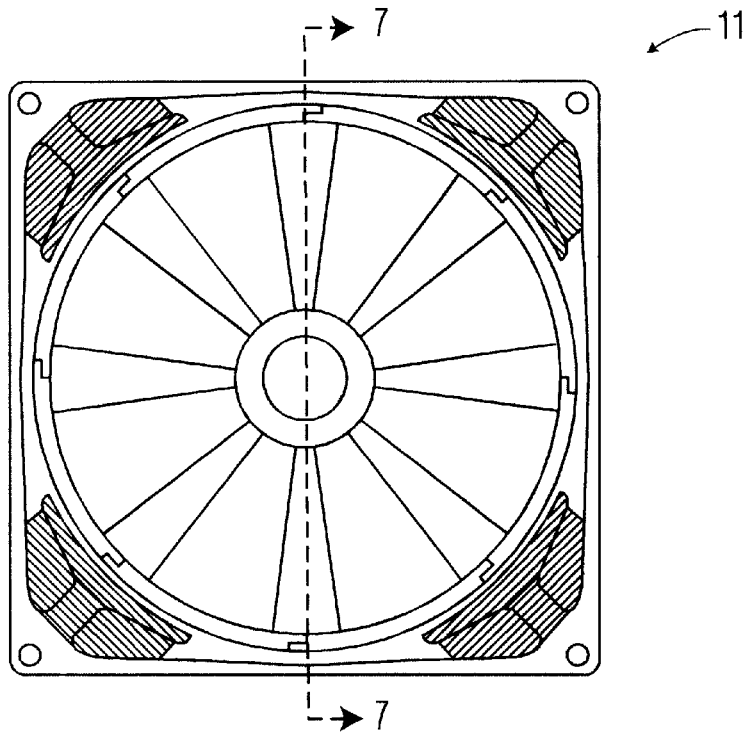
FIG. 6 is similar to FIG. 1 showing an alternate embodiment of a fan according to the present invention.
Figure 7:
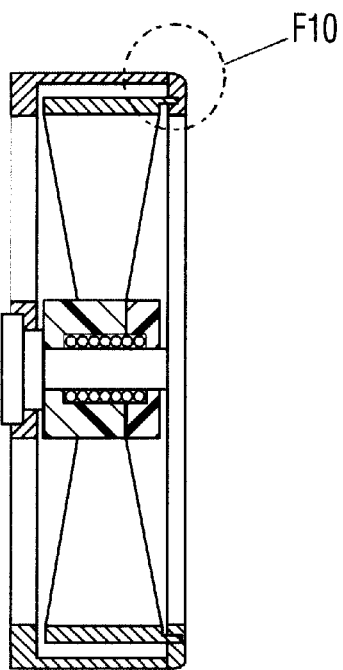
FIG. 7 is similar to FIG. 2 taken along line 7—7 of FIG. 6.
Figure 8:
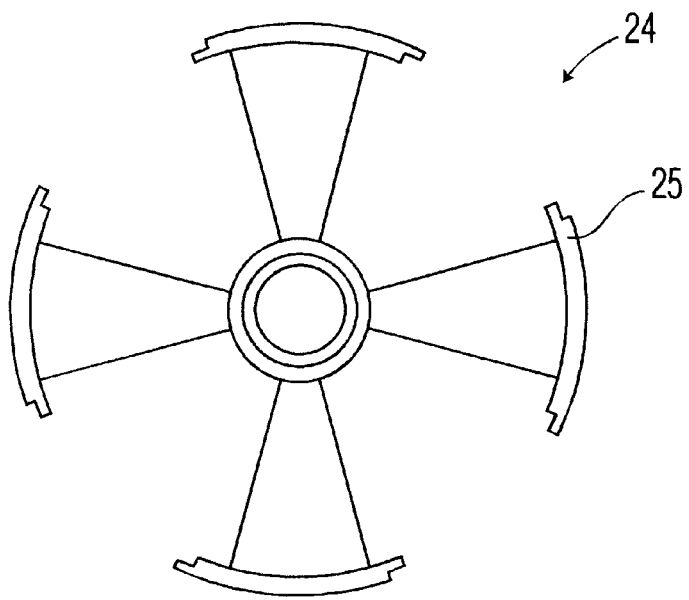
FIG. 8 is similar to FIG. 3 for the fan of FIG. 6.
Figure 9:
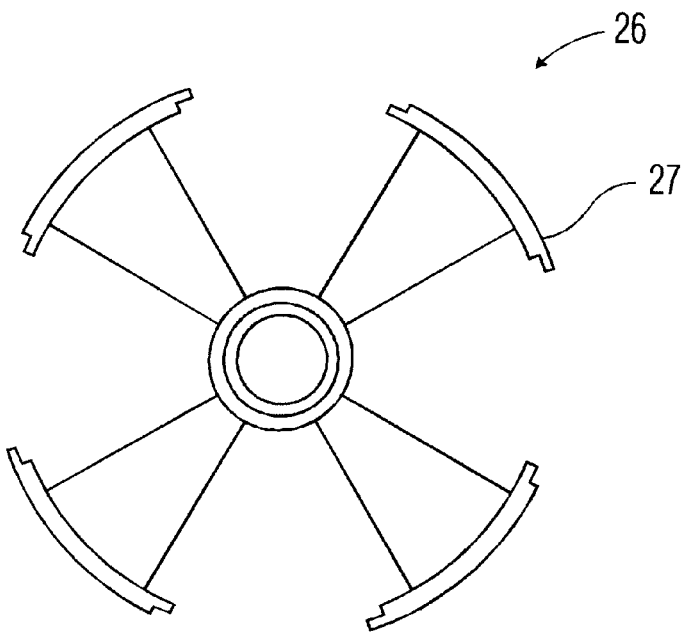
FIG. 9 is similar to FIG. 4 for the fan of FIG. 6.
Figure 10:
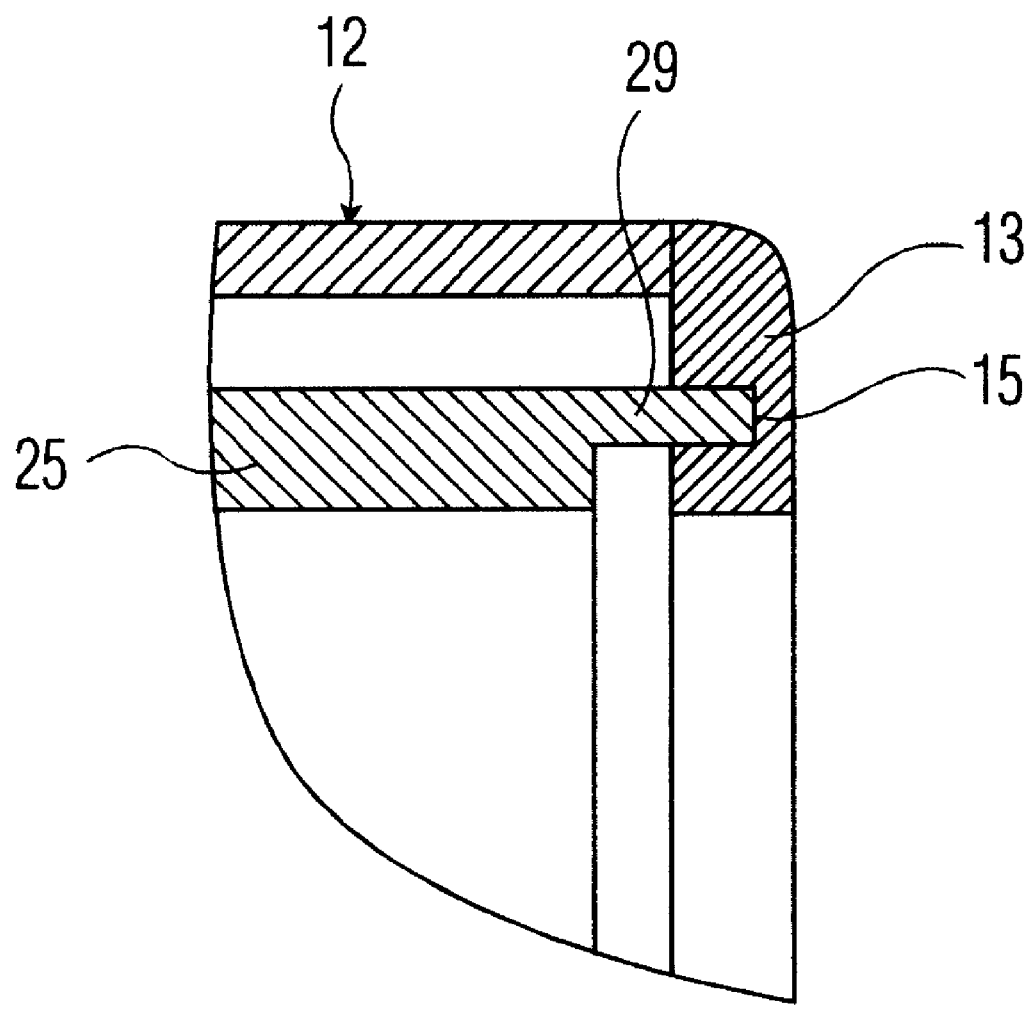
FIG. 10 is a partial enlarged section showing the detail marked "F10" of FIG. 7.

One example of a control circuit for controlling fan operation is shown in FIG. 5. Power and timing are supplied to this circuit through positive regulator 41 to maintain a predetermined voltage such as 12 volts, even though supply voltages to the motor coils may be operated up to higher levels, such as 35 volts. This regulated voltage is filtered by capacitor 42 to reduce transient noise generated by the Hall effect IC 43, which can include VDN 3625 M Alegro™. Resistor 44 supplies internal biasing of the Hall effect IC. The IC 43 has two outputs which change states high and low based on north and south poles crossing its face. The states are latched or maintained until the opposite magnetic pole is applied across its face. These outputs are held at a high state by current through resistors 45 and 46 until the IC 43 pulls them to a low state. The outputs are used through resistors 49 and 50 to turn on the power enhancement MOS-FETS 47 and 48. Resistors 49 and 50 limit the current to the gate of the MOS-FETS. The MOS-FETS responds to the gate voltage to switch high current to the stator of the motor via its drain. Diodes 51 and 52 protect the MOS-FETS from damaging peak reverse voltages generated in the stator coils when deenergized. Coil 53 and 54 respectively in this embodiment, are part of two electromagnetic coil assemblies 32 located in two opposite corners of the stator assembly 16, such as A and C in FIGS. 5 and 1. All coils preferably have an equal number of turns. Coils 55 and 56 respectively are part of the electromagnetic coil assemblies 32 located in the other two opposite corners of the stator assembly 16, such as B and D in FIGS. 5 and 1. For convenience, the stator corners are labeled A, B, C and D. Accordingly, when coil voltage across coils A and C is positive, the coil voltage across coils B and D is negative. And when coil voltage across A and C is negative, a positive voltage appears across coils B and D respectively. In response, the A and C pole shoes will be annularly magnetized with a N-S orientation when B and C pole shoes are annularly magnetized S-N. The magnetic fields from the shoes interact with the magnetic fields of each blade. The predetermined timed reversal of the plus/minus output of IC 43 creates an annular pull-push effect (torque) between the stator fields and the magnetized blades. This action causes continuous blade rotation under predetermined speed, power, and air flow conditions.

It should be understood that bushings 28 and 30 could be formed as a single unitary piece if desired with all blades mounted therein. In this case, the blades are preferably magnetized individually and prior to mounting in their respective bushing although magnetization following bushing mounting is possible. Further, although eight blades and four electromagnets are shown, other suitable combinations may be selected depending upon desired operating parameters and applications.

An alternate embodiment of the present invention is shown in FIGS. 6–10 wherein like reference numerals refer to like elements of FIGS. 1–4. Fan unit 11 includes housing 12 that has an annular lip 13 spanning the periphery of the air flow opening. Lip 13 defines an annular channel or groove 15 opening to the fan rear or upstream to the airflow direction. Sub-impellers 24 and 26 have mounted to their outer blade edges ring segments 25 and 27 shaped to interleave to form a continuous ring member when the sub-impellers are assembled. As better seen in FIG. 10, the forward (downstream) edge 29 of elements 25 and 27 projects into and rides within groove 15 during rotation of the impeller. Channel 15 and edge 29 are dimensioned to substantially prevent air leakage from and turbulence within the space outward of the blade edges and within the housing that would, during operation, lower the fan efficiency and axial downstream air pressure. However, edge 29 should not touch groove 15 walls and should avoid friction or drag development during operation. Segments 25 and 27 can be made of the same magnetic material as the blades and be molded as part of the blade in the same molding process as the blade. Accordingly, with this arrangement, elements 25 and 27 would have the same N-S orientation as the blade to which it is formed. Ferrite density can be greater than, equal to, or less than the ferrite density of the associated blade if magnetized plastics are used. Segments 25 and 27 can have low mass compared to the magnetic blades and serve as an airflow cowling that also blocks air leakage by riding in housing lip channel 15.

If desired, the ring formed by segments 25 and 27 can be made of any suitable non-ferrous, non-magnetic material and be formed continuous as a single unitary piece instead of a series of segments. In this case, this ring only functions as a cowling to effect airflow and not as a source of the magnetic field.

Figure 11:
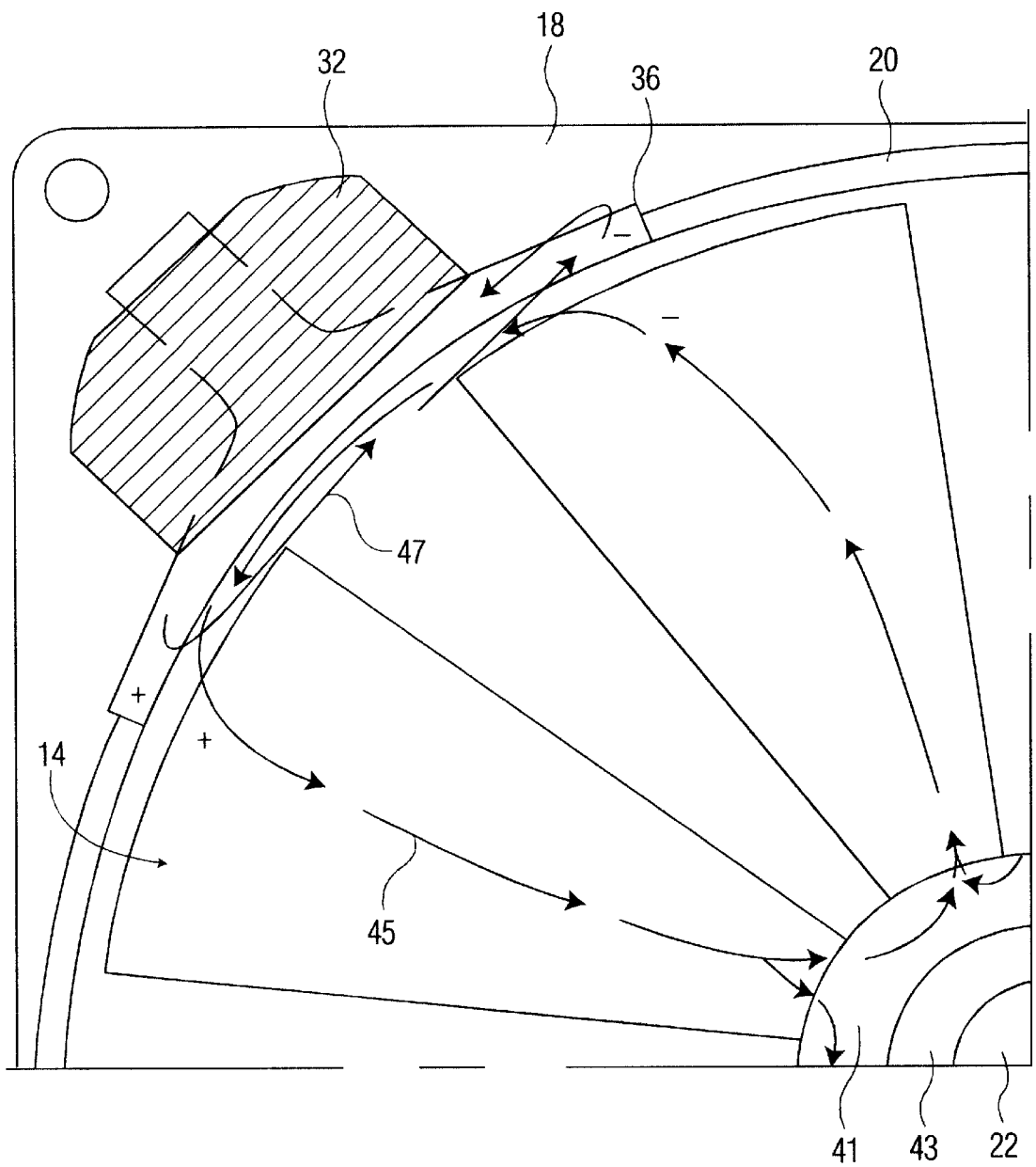
FIG. 11 is a partial, upper left quadrant, view similar to FIG. 1 of an alternate embodiment of the present invention.

Yet another alternate embodiment according to the principles of the present invention is shown in FIG. 11 in which the magnetic blades are mounted in a hub 41 made of material that is a good conductor of magnetic fields. Accordingly, each adjacent pair of blades are magnetically joined through the hub to form a U-shaped or V-shaped magnet that interacts with the respective field of pole shoes 36. Hub 41 can be mounted on or secured to plastic or other suitable material bushing 43 that rotates on shaft 22.

Hub 41 can be formed of ferromagnetic impregnated plastics, such as polyamide, ferrite material, ferrous materials or any suitable alternative.

As seen in FIG. 11, the permanent magnetic field generated by two adjacent blades is represented by arrows 45 is completed through hub 41 which field interacts with the electromagnetic pole shoes field, arrows 47 to produce circumferential forces (torque) on blades 14.

Figure 12:
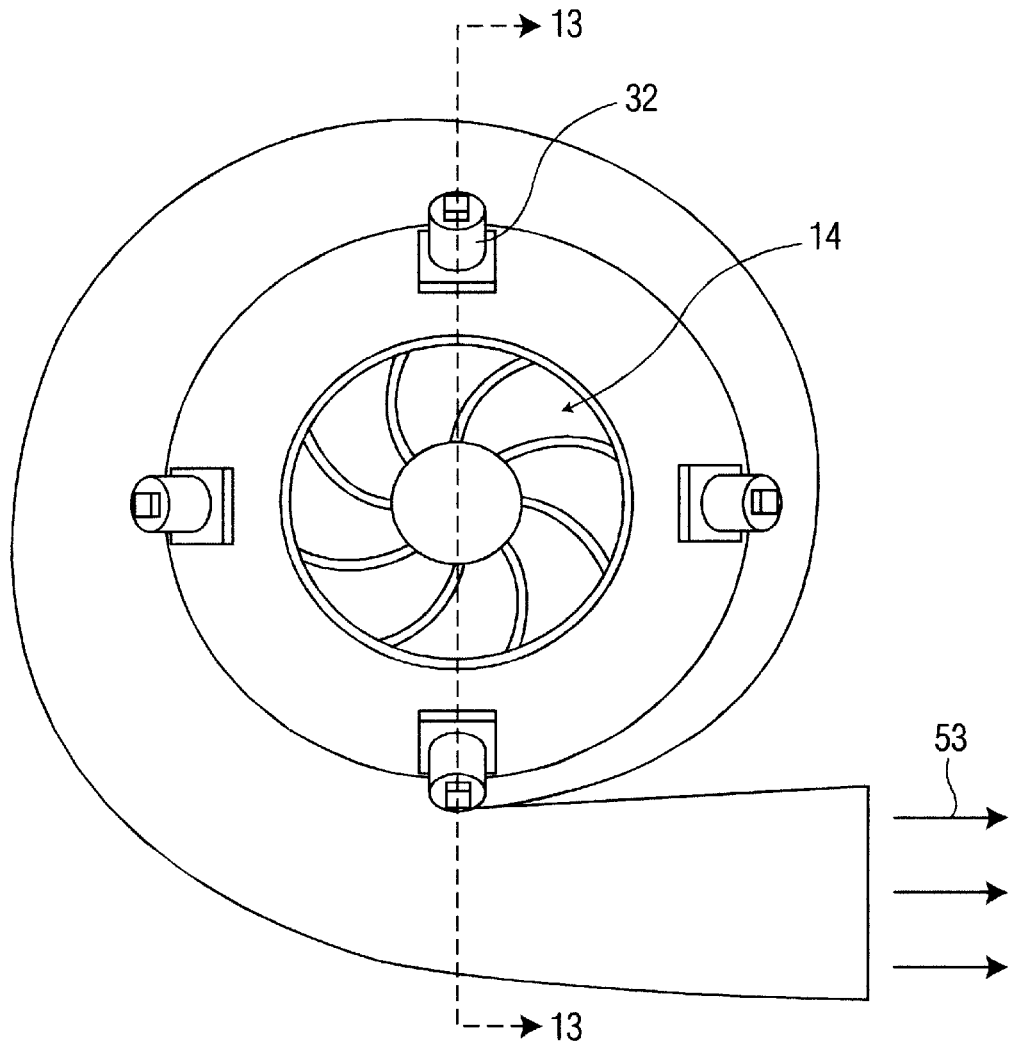
FIG. 12 is a front elevation of yet another alternate embodiment of the present invention.
Figure 13:
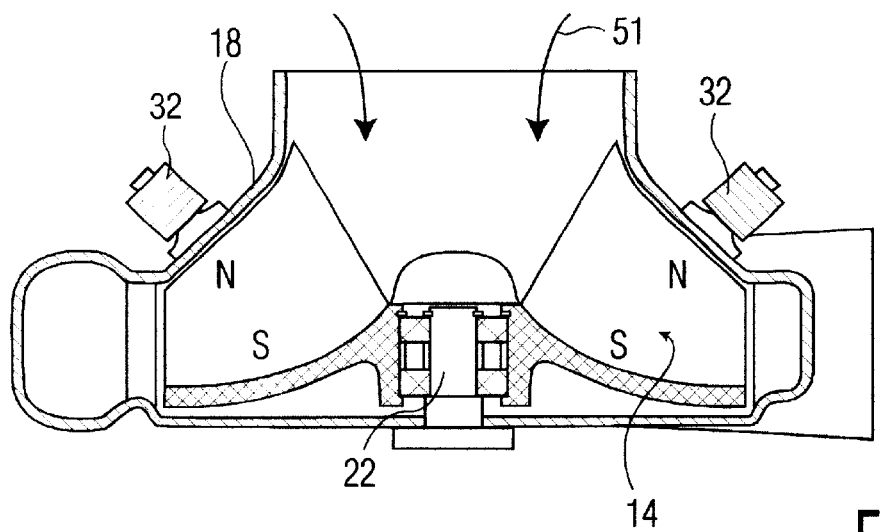
FIG. 13 is a side sectional view taken along line 13—13 of FIG. 12.

It will be appreciated that a fan unit according to the principles of the present invention has many applications in many environments. One example, shown in FIGS. 12 and 13, the fan unit comprises a centrifugal fan and is part of a leaf blower with air intake arrows 51 and exhaust arrows 53. The cowling/channels about the fan blades direct the air flow to exit at 53. Further tubes (not shown) can be inserted to extend the exhaust location in the standard manner.

It should be understood that various and further modifications and changes can be made to the herein disclosed examples and embodiments without departing from the principles of the present invention. The disclosure of the above mentioned U.S. patents are incorporated herein by reference. Also, although examples are depicted with four stator coils and eight blades, it will be understood that various other numbers of stator coils and blades can be selected within the teaching of the present invention.

It should be understood that the blades depicted in FIG. 1–11 are schematic representations of blades and not pictorial representations.

What is claimed is:

1. An apparatus having a fan assembly comprising
   a frame,
   a pulsed direct current electromagnet field assembly mounted to said frame,
   a fan blade assembly mounted relative to said frame for rotation about an axis and having at least two blades substantially permanently magnetized in the radial direction,
   wherein torque is applied to rotate said blade assembly when the magnetic field of said blades interacts with the electromagnetic field of said electromagnetic field assembly,
   said fan assembly comprises at least four blades, each blade having a N-S or S-N radial magnetic field orientation that is opposite to its adjacent blade, and
   wherein said fan assembly comprises first and second fan subassemblies in which all blades of said first subassembly are magnetized with the same radial N-S orientation and all blades of said second subassembly are magnetized with the same S-N orientation and the first and second subassemblies are coupled together.

2. An apparatus according to claim 1 wherein
   said fan assembly includes an axis member mounted fixed relative said frame and a hub member rotatably mounted to said axis member, and
   said blades being mounted to said hub.

3. An apparatus according to claim 2 wherein said hub is made of non-magnetizable material.

4. An apparatus according to claim 2 wherein said hub is made of magnetizable material.

5. An apparatus according to claim 1 wherein
   said frame includes a cylindrical member axially aligned with and extending about said blades for confining and directing the axial air flow.

6. An apparatus according to claim 5 wherein said cylindrical member comprises partial cylindrical segments spaced annularly from each other, and said electromagnetic field assembly comprises pole shoes positioned in the spaces between said segments to complete the cylindrical form of said cylindrical member.

7. An apparatus according to claim 5 wherein
   said cylindrical member includes an annular lip defining an upstream facing annular surface,
   said fan blade assembly comprising an annular ring coupled to and extending around the outer radial edges of said blades, said ring rotatable in close proximity to said surface to substantially reduce the airflow axially beyond said surface.

8. An apparatus according to claim 7 wherein said annular ring comprises segments formed as part of and as a single unitary piece of each respective blade, and each segment being magnetized with the same N-S orientation as its respective blade.

9. An apparatus according to claim 7 wherein said annular ring comprises a continuous ring made of non-magnetizable material.

10. An apparatus according to claim 1 wherein said blades have outer radial edges, said fan blade assembly comprising an annular ring made of the same magnetizable material as said blades coupled to and extending around said outer radial edges of said blades, and wherein said annular ring comprises segments formed as part of and as a single unitary piece of each respective blade, and each segment being magnetized with the same N-S orientation as its respective blade.

11. An apparatus according to claim 1 wherein said electromagnetic field assembly includes at least two electromagnetic coil assemblies oriented substantially 180° from each other on a line radially through the blade assembly axis.

* * * * *